(12) United States Patent
Wang et al.

(10) Patent No.: US 9,769,888 B2
(45) Date of Patent: Sep. 19, 2017

(54) DRIVING CIRCUIT AND DRIVING METHOD FOR A PLURALITY OF LED STRINGS

(71) Applicant: Silergy Semiconductor Technology (Hangzhou) LTD, Hangzhou, ZheJiang Province (CN)

(72) Inventors: Xudong Wang, Hangzhou (CN); Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/148,646

(22) Filed: May 6, 2016

(65) Prior Publication Data

US 2016/0366733 A1 Dec. 15, 2016

(30) Foreign Application Priority Data

Jun. 9, 2015 (CN) .......................... 2015 1 0313704

(51) Int. Cl.
*H05B 33/08* (2006.01)

(52) U.S. Cl.
CPC ..... *H05B 33/0815* (2013.01); *H05B 33/0827* (2013.01); *H05B 33/0839* (2013.01); *H05B 33/0845* (2013.01); *H05B 33/0851* (2013.01); *H05B 33/0884* (2013.01); *H05B 33/0887* (2013.01)

(58) Field of Classification Search
CPC ............ H05B 33/0827; H05B 33/0815; H05B 33/0887; H05B 33/083; H05B 37/02; H05B 33/0824; H05B 33/0851; H05B 33/0842; H05B 33/0845; H05B 33/0881; H05B 41/2851; H05B 33/0809; H05B 33/0812; H05B 33/0839; H05B 33/0884; G09G 3/3406

See application file for complete search history.

(56) References Cited

U.S. PATENT DOCUMENTS

| 7,733,034 B2 * | 6/2010 | Kotikalapoodi ... H05B 33/0815 |
| | | 315/294 |
| 8,390,262 B2 * | 3/2013 | Chang ................ H05B 33/0818 |
| | | 315/209 R |
| 8,525,423 B2 * | 9/2013 | Yu ........................ G09G 3/3406 |
| | | 315/185 R |

(Continued)

*Primary Examiner* — Vibol Tan
(74) *Attorney, Agent, or Firm* — Michael C. Stephens, Jr.

(57) ABSTRACT

A constant current driving circuit can include: LED strings; a voltage regulator configured to provide an output voltage signal as a supply for the LED strings; current regulating circuits corresponding to the LED strings, and being coupled between the LED strings and ground, where the current regulating circuits are configured to regulate currents through the LED strings according to present currents and reference current signals; a voltage feedback circuit configured to receive input voltage signals of the current regulating circuits, and to select a voltage feedback signal for controlling the output voltage signal according to the voltage feedback signal and a reference voltage signal; and a signal generating circuit corresponding to the current regulating circuits, where each signal generating circuit receives an input voltage signal of a corresponding current regulating circuit, and generates an error amplifying signal according to the input voltage signal and the reference voltage signal.

11 Claims, 4 Drawing Sheets

(56) References Cited

U.S. PATENT DOCUMENTS

| | | |
|---|---|---|
| 8,729,819 B2 | 5/2014 | Zhao et al. |
| 8,760,063 B2 | 6/2014 | Zhao |
| 8,773,041 B2 | 7/2014 | Chen |
| 8,773,047 B2 | 7/2014 | Chen |
| 9,024,542 B2 | 5/2015 | Chen |
| 9,107,270 B2 | 8/2015 | Chen |
| 9,198,245 B2 | 11/2015 | Deng et al. |
| 9,351,370 B2 * | 5/2016 | Malinin ............. H05B 33/0815 |
| 9,468,055 B2 * | 10/2016 | Cheng ................ H05B 33/0818 |
| 2011/0273102 A1 | 11/2011 | Van de Ven et al. |
| 2015/0076999 A1 * | 3/2015 | Malinin ............. H05B 33/0815 315/186 |
| 2016/0044754 A1 | 2/2016 | Xu et al. |

* cited by examiner

DRIVING CIRCUIT AND DRIVING METHOD FOR A PLURALITY OF LED STRINGS

RELATED APPLICATIONS

This application claims the benefit of Chinese Patent Application No. 201510313704.9, filed on Jun. 11, 2015, which is incorporated herein by reference in its entirety.

FIELD OF THE INVENTION

The present invention generally relates to the field of light-emitting diode (LED) drivers, and more particularly to driving circuits and methods for LED strings.

BACKGROUND

LED strings typically may be coupled in parallel and/or in series in lighting and backlighting applications. Each LED string may include one or more series coupled LED lights, and the brightness of each LED light can be determined by a current flowing through the LED light. Since the characteristic of each LED string may be different from others, the turn-on voltage drops of LED lights may be different even though the currents are the same. Thus, independent current regulating circuits, such as linear regulators (e.g., low drop-out regulators [LDOs]), may be used to respectively control the currents flowing through the LED strings.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
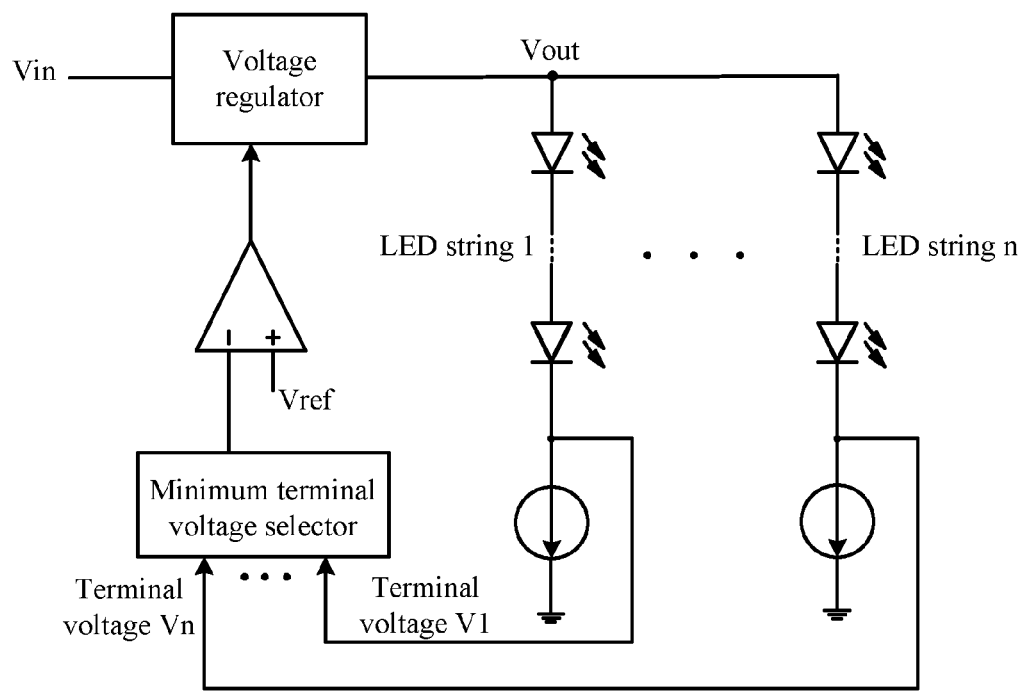
FIG. 1 is a schematic block diagram of an example constant current driving circuit for a plurality of LED strings.

Referring now to FIG. 1, shown is a schematic block diagram of an example constant current driving circuit for a plurality of light-emitting diode (LED) strings. In this case, the current regulating circuit of each LED string may have a different input voltage from others. In this example, be voltage regulator can receive external input voltage Vin, and provide a supply voltage for a plurality of LED strings at an output terminal. A voltage signal obtained at an input terminal of a current regulating circuit with a lowest input voltage can be selected as a feedback signal. This feedback signal can be used to regulate a voltage (e.g., Vout) at the output terminal of the voltage regulator, in order to guarantee normal operation of all LED strings. However, the remaining current regulating circuits may see larger voltage drops, and which can lead to increased power losses on the current sources. Also, such drive chips may have disadvantages, such as high product costs, relatively large volume, and relatively poor efficiency.

In one embodiment, a constant current driving circuit can include: (i) a plurality of LED strings; (ii) a voltage regulator configured to provide an output voltage signal as a supply for the plurality of LED strings; (iii) a plurality of current regulating circuits corresponding to the plurality of LED strings, and being coupled between the plurality of LED strings and ground, where the plurality of current regulating circuits are configured to regulate currents through the plurality of LED strings according to present currents and reference current signals; (iv) a voltage feedback circuit configured to receive input voltage signals of the plurality of current regulating circuits, and to select a minimum one as a voltage feedback signal, where the voltage feedback circuit is configured to control the output voltage signal according to the voltage feedback signal and a reference voltage signal; and (v) a plurality of signal generating circuit corresponding to the plurality of current regulating circuits, where each signal generating circuit is configured to receive an input voltage signal of a corresponding current regulating circuit, and to generate an error amplifying signal according to the input voltage signal and the reference voltage signal, and to generate the reference current signal and a duty cycle regulating signal according to the error amplifying signal, where the duty cycle regulating signal is configured to regulate an average current of the plurality of LED strings.

Figure 2:
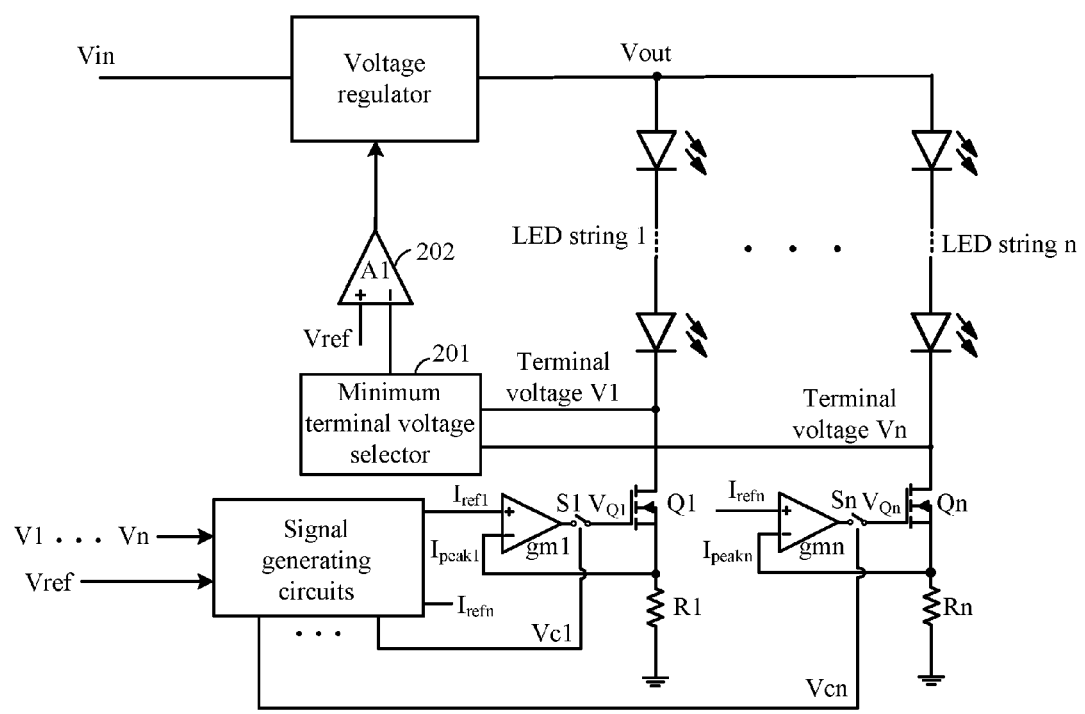
FIG. 2 is a schematic block diagram of an example constant current driving circuit for a plurality of LED strings, in accordance with embodiments of the present invention.

Referring now to FIG. 2, shown is a schematic block diagram of an example constant current driving circuit for a plurality of LED strings, in accordance with embodiments of the present invention. In this particular example, a constant current driving circuit for a plurality of LED strings may include a voltage regulator, and a plurality of LED strings (e.g., LED string 1 to LED string "n" coupled in parallel). The voltage regulator can receive external input voltage Vin, and may provide an appropriate output voltage (e.g., Vout) for the LED strings. The voltage regulator can be any suitable converter (e.g., a boost-type voltage regulator, a buck-type voltage regulator, a buck-boost-type voltage regulator, a flyback-type voltage regulator, a forward-type voltage regulator, etc.). In this example, the constant current driving circuit may also include a plurality of current regulating circuits that correspond to the plurality of LED strings, a voltage feedback circuit, and a plurality of signal generating circuits that correspond to the plurality of current regulating circuits.

For example, each current regulating circuit can be a linear regulator used to regulate the current through one LED string. Each linear regulator may include transistor Qn, resistor Rn, transconductance operational amplifier gmn, and a switching circuit. The transistor Qn may have a first terminal connected to a corresponding LED string, and a second terminal coupled to ground through resistor Rn.

Transconductance operational amplifier gmn may have a first input terminal connected to a common node of transistor Qn and resistor Rn, for sampling peak current signal $I_{peakn}$ of the LED string via resistor Rn. The transconductance operational amplifier gmn may also have a second input terminal that can receive reference current signal $I_{refn}$ provided by a corresponding signal generating circuit. The transconductance operational amplifier gmn may also have an output terminal to output an error current signal, and to generate error voltage signal $V_{Qn}$ by compensating the error current signal. The switching circuit may include switch Sn connected between the output terminal of transconductance operational amplifier gmn and a control terminal of transistor Qn. For example, switch Sn can be controlled by a corresponding duty cycle regulating signal (e.g., Vcn).

The voltage feedback circuit may include minimum terminal voltage selector 201 and error amplifying circuit 202. Minimum terminal voltage selector 201 can receive input voltage signals of a plurality of current regulating circuits (e.g., terminal voltages V1 to Vn), and select a minimum one as the voltage feedback signal. Minimum terminal voltage selector 201 can include a current source and a diode. Error amplifying circuit 202 can include error amplifier A1 and a compensation circuit (e.g., including a resistor and a capacitor). Error amplifying circuit A1 can receive the voltage feedback signal and reference voltage signal Vref, and may generate an error amplifying signal for the voltage regulator. For example, reference voltage signal Vref may represent an expected normal operating voltage of a current regulating circuit.

Figure 3:
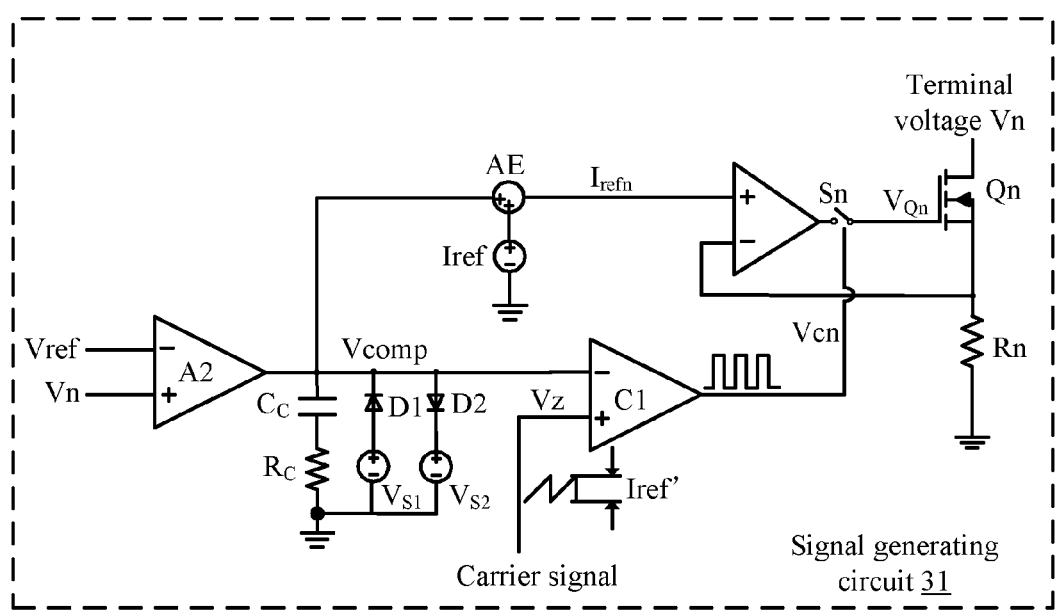
FIG. 3 is a schematic block diagram of an example signal generating circuit, in accordance with embodiments of the present invention.

Referring now to FIG. 3, shown is a schematic block diagram of an example signal generating circuit, in accordance with embodiments of the present invention. A plurality of such signal generating circuits 31 may be used to generate the plurality of reference current signals (e.g., $I_{ref1}, \ldots, I_{refn}$) and a plurality of duty cycle regulating signals (e.g., Vc1, . . . , Vcn) for the corresponding current regulating circuits. For example, each of signal generating circuits 31 may include an error compensation circuit and an average current controlling circuit. The error amplifying circuit may include error amplifier A2 and a compensating circuit (e.g., compensating capacitor $C_C$ and compensating resistor $R_C$). The error compensating circuit can receive an input voltage signal (e.g., terminal voltage Vn) of a corresponding current regulating circuit, and may generate error compensation signal Vcomp.

The average current controlling circuit may include a superimpose circuit and a comparison circuit. In this example, the superimpose circuit may include adder AE, and the comparison circuit may include comparator C1. Adder AE can receive error compensation signal Vcomp and reference current signal Iref, and may generate the reference current signal $I_{refn}$ through superimposition. Comparator C1 can receive error compensation signal Vcomp and carrier signal $V_Z$, and may generate duty cycle regulating signal Vcn. For example, reference current signal Iref may be consistent with (e.g., the same as) an expected operating current of an LED string. Also, the peak value of the carrier signal can be equal to a sum of reference current signal Iref and error compensation signal Vcomp. Further, in some cases of relatively low precision requirements, the peak value of the carrier signal may be set as the reference current signal.

Each of a plurality of signal generating circuits 31 may also include a clamping circuit coupled between the error compensating circuit and an average current controlling circuit. For example, the clamping circuit may include an upper voltage clamping circuit and a lower voltage clamping circuit. The lower voltage clamping circuit may include voltage source $V_{S1}$ and diode D1, where diode D1 has a cathode connected to an output terminal of the error amplifier A2, and an anode coupled to ground through voltage source $V_{S1}$. The upper voltage clamping circuit may include voltage source $V_{S2}$ and diode D2, where diode D2 has an anode connected to the output terminal of error amplifier A2, and a cathode coupled to ground through voltage source $V_{S2}$. The upper and lower voltage clamping circuits may be utilized to clamp error compensation signal Vcomp in the range of an upper limit value (e.g., the value of voltage source $V_{S2}$) and a lower limit value (e.g., the value of voltage source $V_{S1}$).

In one embodiment, a method of constant current driving for a plurality of LED strings, can include: (i) regulating the currents of the plurality of LED strings by a plurality of current regulating circuits, where each of the plurality of current regulating circuits is configured to regulate the current of a corresponding of the LED strings according to a present current through the LED string and a corresponding reference current signal; (ii) controlling an output voltage of a voltage regulator according to a voltage feedback signal obtained from a reference voltage signal and the LED string with a largest voltage drop; (iii) receiving input voltage signals of the plurality of current regulating circuits, and comparing and amplifying each input voltage signal with the reference voltage signal; and (iv) generating the corresponding reference current signal and a duty cycle regulating signal according to a comparison result, the duty cycle regulating signal regulating an average current of the LED strings.

Figure 4:
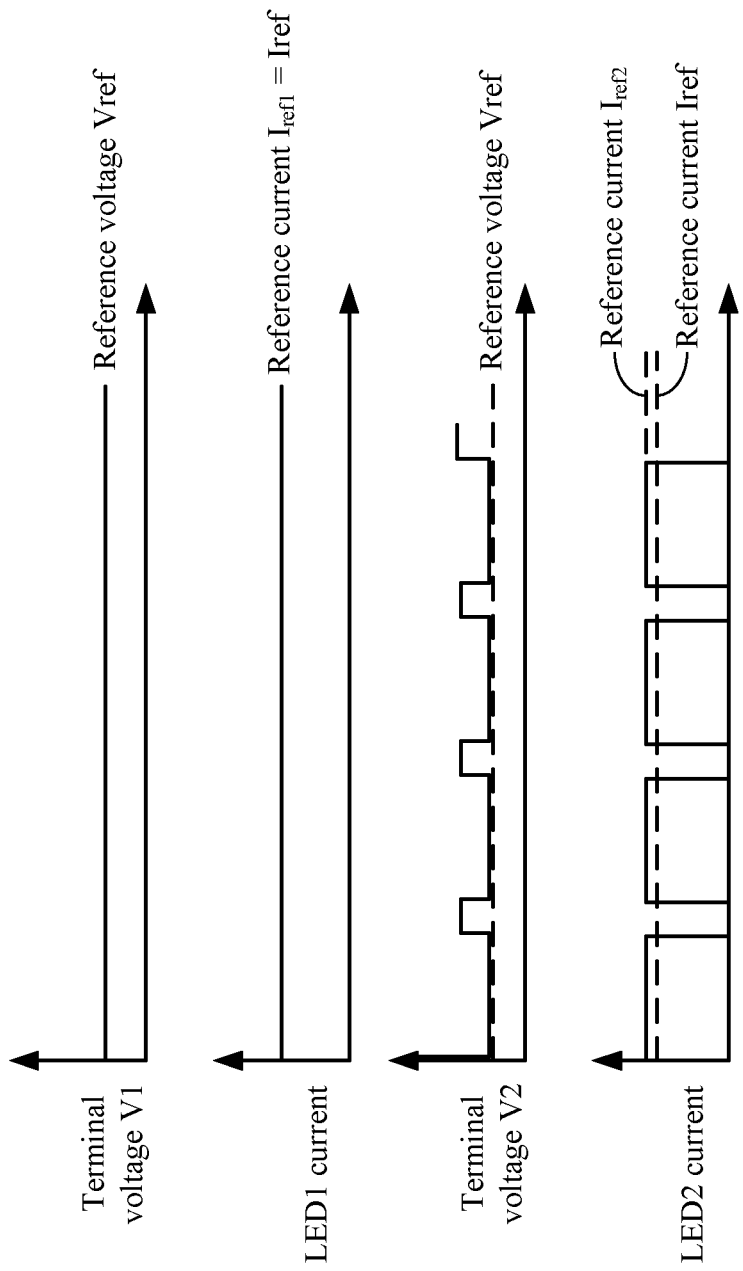
FIG. 4 is a waveform diagram of example operation of the circuit shown in FIG. 2, in accordance with embodiments of the present invention.

Referring now to FIG. 4, shown is a waveform diagram of example operation of the circuit shown in FIG. 2, in accordance with embodiments of the present invention. The following may describe operating principles of particular embodiments according to the example constant current driving circuit for LED strings (FIGS. 2 and 3), in conjunction with the waveform diagram shown in FIG. 4. Two LED strings are taken as an example in FIG. 4, and LED string 1 may have a larger voltage drop. During the initiate state, the minimum terminal voltage selector may choose a lowest signal at one input terminal of a plurality of current regulating circuits as a voltage feedback signal. For example, terminal voltage V1 may be selected as the voltage feedback signal to compare with reference voltage signal Vref to control an output voltage (e.g., Vout) of the voltage regulator. In this way, output voltage Vout of the voltage regulator can be at an optimal value in order to guarantee the operation of the LED strings.

Each signal generating circuit may compare and compensate a terminal voltage (e.g., V1, . . . , Vn) of a corresponding current regulating circuit and reference voltage signal Vref. An output signal of error amplifier may indicate if the terminal voltage is too high or too low. If the terminal voltage is too high, the superimpose circuit may add error compensation signal Vcomp and reference current signal Iref to generate reference current signal $I_{refn}$. The current regulating circuit may control the current through a corresponding LED string according to reference current signal $I_{refn}$, so as to increase the peak current of the LED string, and lead to an increase of the voltage drop of the LED string. As a result, the terminal voltage of the current regulating circuit may decrease in order to reduce power losses.

On the other hand, comparator C1 may compare error compensation signal Vcomp against carrier signal Vz, in order to generate duty cycle regulating signal Vcn. When duty cycle regulating signal Vcn is high (e.g., active), switching circuit Sn may be turned on. When duty cycle regulating signal Vcn is low (e.g., inactive), switching circuit Sn may be turned off. The peak value of the carrier signal may equal to the sum of reference current signal Iref and carrier signal Vz. Thus, duty cycle regulating signal Vcn may control switching circuit Sn to be off for a corresponding time when reference current signal $I_{refn}$ has been increased by a certain proportion, so as to maintain the average current of the corresponding LED string as substantially constant.

If the output of the error amplifier indicates the terminal voltage is too low, the superimpose circuit and the comparator may not be enabled. In this case, reference current signal Iref may remain unchanged and the transistor may operate with a full duty cycle. The clamping circuit may clamp error compensation signal Vcomp from the error compensation circuit. If the output of the error amplifier is too high, the upper voltage clamping circuit may clamp the error compensation signal at an upper limit value to prevent the peak value of the LED string from becoming too large, so as to avoid abnormal operation of the LED string. If the output of the error amplifier is too small or is a negative value, the lower voltage clamping circuit may clamp the error compensation signal at a lower limit value (e.g., zero), and the outputs of the superimpose circuit and the comparator may remain unchanged. As one skilled in the art will recognize, peak current signal $I_{peakn}$, reference current signal $I_{refn}$, and reference current signal Iref may actually be voltage signals that represent corresponding currents.

LED string 1 may be a branch with a larger voltage drop, so terminal voltage V1 may be equal to reference voltage Vref. Also, the current through LED string 1 may be consistent with (e.g., the same as) reference current signal $I_{ref1}$, which is equal to the expected operation current (e.g., Iref) of the LED string. Terminal voltage V2 of LED string 2 may be greater than reference voltage Vref, and the signal generating circuit may generate reference current $I_{ref2}$ to be larger than reference current signal Iref. Also, the duty cycle regulating signal may be used to control the switching circuit, so as to keep the current through LED string 2 at zero for a certain time period. Therefore, the average current of LED string 2 may remain unchanged on the whole, and terminal voltage V2 of the current regulating circuit of LED string 2 may be as shown in FIG. 4. However, while some power losses may remain during the switching operation of the transistor due to the relatively large terminal voltage V2, the system efficiency may be improved in applications with a plurality of LED strings.

In particular embodiments, each signal generating circuit may generate a duty cycle regulating signal (e.g., Vc1, . . . , Vcn) for a corresponding reference current signal (e.g., $I_{ref1}$, . . . , $I_{refn}$), so as to control the terminal voltage (e.g., V1, . . . , Vn) of a corresponding current regulating circuit by controlling the voltage drop of each LED string. This can avoid power losses due to the relatively larger terminal voltage of the current regulating circuit. In addition, the average current of the LED strings may equal an expected operation current (e.g., Iref), in order to guarantee normal operation of the LED strings. In this way, the voltage drop of the LED string may be controlled to rise when the current regulating circuit bears a large voltage drop, so as to reduce the voltage drop of the current regulating circuit, and to reduce power losses.

Also in particular embodiments a constant driving method for a plurality of LED strings can be used with a constant current driving circuit. The constant current driving circuit may include a voltage regulator for providing a supply voltage (e.g., Vout) for a plurality of LED strings. The constant current driving method may include regulating the currents of a plurality of LED strings by a plurality of current regulating circuits. Each of the current regulating circuits may be used to regulate the current of a corresponding LED string according to the present current through the LED string and a corresponding reference current signal (e.g., $I_{ref1}$, . . . , $I_{refn}$). The constant current driving method may also include controlling an output voltage of the voltage regulator according to a voltage feedback signal obtained (e.g., by 201) from the LED string with the largest voltage drop and a reference voltage signal (e.g., Vref). The constant current driving method may also include receiving input voltage signals of the plurality of current regulating circuits, comparing and amplifying each input voltage signal with the reference voltage signal, and generating a corresponding reference current signal and a duty cycle regulating signal (e.g., Vc1, . . . , Vcn) according to a comparison result. The duty cycle regulating signal is used to regulate the average current of the LED strings.

In particular embodiments, generating the reference current signal and the duty cycle regulating signal may include receiving an input voltage signal of a current regulating circuit, and generating an error compensation signal (e.g., Vcomp) after comparison and amplification. This may also include receiving the error compensation signal, generating a corresponding reference current signal by adding the error compensation signal with the reference current signal (e.g., Iref), and further generating a corresponding duty cycle regulating signal by comparing the error compensation signal against a carrier signal (e.g., Vz). For example, the reference current signal may be consistent with an expected operation current of the LED strings, and the peak value of the carrier signal can be equal to the reference current signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A constant current driving circuit, comprising:
   a) a plurality of light-emitting diode (LED) strings;
   b) a voltage regulator configured to provide an output voltage signal as a supply for said plurality of LED strings;
   c) a plurality of current regulating circuits corresponding to said plurality of LED strings, and being coupled between said plurality of LED strings and ground, wherein each of said plurality of current regulating circuits is configured to regulate a driving current through said LED string according to a reference current signal; and
   e) a plurality of signal generating circuits corresponding to said plurality of current regulating circuits, wherein each signal generating circuit is configured to to increase said reference current signal and to regulate an on duty cycle of said current regulating circuit when an input voltage signal of said current regulating circuit is greater than a voltage threshold, in order to regulate said driving current to maintain a brightness of said LED string.

2. The constant current driving circuit of claim 1, wherein each of said plurality of signal generating circuit comprises:

a) an error compensation signal configured to receive said input voltage signal of said corresponding current regulating circuit, and to generate an error compensation signal after comparison; and
b) an average current controlling circuit configured to receive said error compensation signal, and to generate said reference current signal by adding said error compensation signal with a reference current signal, and further to generate said duty cycle regulating signal by comparing said error compensation signal against a carrier signal.

3. The constant current driving circuit of claim 2, wherein each of said plurality of signal generating circuit comprises a clamping circuit coupled between said error compensation circuit and said average current controlling circuit, wherein said clamping circuit comprises an upper limit value and a lower limit value, and wherein said clamping circuit is configured to clamp said error compensation signal in the range of said upper and lower limit values.

4. The constant current driving circuit of claim 2, wherein said average current controlling circuit comprises:
a) a superimpose circuit configured to receive said error compensation signal and said reference current signal, and to generate said reference current signal; and
b) a comparison circuit configured to receive said error compensation signal and said carrier signal, and to generate said duty cycle regulating signal, wherein said reference current signal is consistent with an expected operation current of said LED strings, and wherein a peak value of said carrier signal equals a sum of said reference current signal and said error compensation signal.

5. The constant current driving circuit of claim 1, wherein each of said plurality of current regulating circuits comprises:
a) a transistor having a first terminal coupled to an LED string, and a second terminal coupled through a resistor to ground;
b) a transconductance operational amplifier having a first input terminal coupled a common node of said transistor and said resistor, a second input terminal configured to receive said reference current signal, and an output terminal configured to provide an error current signal, wherein an error voltage signal is obtained by compensating said error current signal; and
c) a switching circuit coupled between said output terminal of said transconductance operational amplifier and a control terminal of said transistor, wherein said switching circuit is controllable by said duty cycle regulating signal.

6. The constant current driving circuit of claim 1, further comprising a voltage feedback circuit, comprising:
a) a minimum terminal voltage selector configured to receive said input voltage signals of said plurality of current regulating circuits, and to select said minimum one as said voltage feedback signal; and
b) an error amplifying circuit configured to receive said voltage feedback signal and said reference voltage signal, and to generate said error amplifying signal, wherein said reference voltage signal represents an expected voltage of said plurality of said current regulating circuits in a normal operation state.

7. A method of constant current driving for a plurality of LED strings, the method comprising:
a) regulating the currents of said plurality of LED strings by a plurality of current regulating circuits, wherein each of said plurality of current regulating circuits is configured to regulate a driving current of a corresponding of said LED strings according to a present current through said LED string according to a reference current signal;
c) receiving input voltage signals of said plurality of current regulating circuits, and comparing each input voltage signal against a voltage threshold; and
d) increasing said reference current signal and regulating an duty cycle when an input voltage signal of said current regulating circuit is greater than said voltage threshold, in order to regulate said driving current to maintain a brightness of said LED string.

8. The method of claim 7, wherein said generating said reference current signal and said duty cycle regulating signal comprises:
a) receiving an input voltage signal of a current regulating circuit, and generating an error compensation signal;
b) receiving said error compensation signal, and generating said corresponding reference current signal by adding said error compensation signal with said reference current signal; and
c) generating a corresponding duty cycle regulating signal by comparing said error compensation signal against a carrier signal.

9. The method of claim 8, wherein said reference current signal is consistent with an expected operation current of said LED strings, and wherein a peak value of said carrier signal equals a sum of said reference current signal and said error compensation signal.

10. The method of claim 8, further comprising clamping said error compensation signal in the range of an upper limit value and a lower limit value.

11. The method of claim 8, wherein said regulating said currents of said LED strings by said plurality of current regulating circuits comprises:
a) generate an error voltage signal by comparing and compensating a present current of said LED string and said reference current signal;
b) controlling the switching operation of a transistor coupled with said LED string according to said error voltage signal, for maintaining a peak current of said LED string consistent with said reference current signal; and
c) using said duty cycle regulating signal to control a time period during which said error voltage signal is input to a control terminal of said transistor, for maintaining an average current of said LED strings consistent with an expected operating current.

\* \* \* \* \*